US006243948B1

(12) United States Patent
Lee et al.

(10) Patent No.: US 6,243,948 B1
(45) Date of Patent: Jun. 12, 2001

(54) MODIFICATION AND REPAIR OF FILM COOLING HOLES IN GAS TURBINE ENGINE COMPONENTS

(75) Inventors: Ching-Pang Lee, Cincinnati, OH (US); Robert A. Johnson, Simpsonville, SC (US); Nesim Abuaf, Schenectady, NY (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/443,132

(22) Filed: Nov. 18, 1999

(51) Int. Cl.[7] ....................................... B23P 15/00
(52) U.S. Cl. .................... 29/889.1; 29/889.721; 29/402.05; 29/402.06
(58) Field of Search ............. 29/889.1, 889.721, 29/889.7, 889.72, 402.06, 402.05

(56) References Cited

U.S. PATENT DOCUMENTS

| 5,062,768 | * | 11/1991 | Marriage | 29/889.721 |
|---|---|---|---|---|
| 5,160,822 | * | 11/1992 | Aleshin . | |
| 5,254,413 | * | 10/1993 | Maricocchi . | |
| 5,356,265 | | 10/1994 | Kercher | 416/97 R |
| 5,382,133 | | 1/1995 | Moore et al. | 415/115 |
| 5,392,515 | * | 2/1995 | Auxier et al. | 29/889.721 |
| 5,418,345 | | 5/1995 | Adamski | 219/69.17 |
| 5,512,382 | * | 4/1996 | Strangman . | |
| 5,621,968 | * | 4/1997 | Kikkawa et al. | 29/889.7 |
| 5,771,577 | * | 6/1998 | Gupta et al. . | |
| 5,837,960 | * | 11/1998 | Lewis et al. . | |
| 5,864,949 | * | 2/1999 | Kildea | 29/889.7 |
| 5,900,170 | * | 5/1999 | Marcin, Jr. et al. . | |
| 6,042,879 | * | 3/2000 | Draghi et al. | 29/889.1 |
| 6,042,880 | * | 3/2000 | Rigney et al. . | |
| 6,146,692 | * | 11/2000 | Sangeeta et al. | 29/889.1 |

OTHER PUBLICATIONS

U.S. application No. 08/955,226 filed Oct. 22, 1997, Inventor: Kercher entitled Spanwise Fan Diffusion Hole Airfoil.
U.S application No. 09/045,809 filed Mar. 23, 1998., Inventor: Gorman entitled Dual–Property Alpha–Beta Titanium Alloy Forgings.

* cited by examiner

Primary Examiner—Irene Cuda
(74) Attorney, Agent, or Firm—Andrew C. Hess; Gerry S. Gressel

(57) ABSTRACT

A method for modifying cooling holes in a gas turbine engine film-cooled component by machining cooling hole outlets to enlarge the outlets and remove any portion of the cooling hole walls which might exhibit cracks.

18 Claims, 4 Drawing Sheets

MODIFICATION AND REPAIR OF FILM COOLING HOLES IN GAS TURBINE ENGINE COMPONENTS

BACKGROUND OF THE INVENTION

This invention relates to modification and repair of cooling holes in components in gas turbine engines and, in particular, to the modification and repair of such holes in stator airfoils, rotor airfoils, and other components exposed to hot gas.

Turbine nozzles and blades and other components in aircraft engines and power generation equipment rely on film cooling to cool surfaces exposed to hot gas. With film cooling a film of air flows out of small holes in the airfoil and over the airfoil surface so as to cool the surface, acting as a barrier between hot flowpath gases and the surface. These small holes tend to develop cracks, which can result in the airfoil having to be replaced when the number and size of the cracks exceed maintenance limits. Airfoils with such cracks must be scrapped because such cracks tend to propagate radially and axially from the cooling holes and can eventually result in component failure.

BRIEF SUMMARY OF THE INVENTION

Film cooling holes in gas turbine engine components are machined to remove material from their cooling hole walls, enlarge their outlets, and form tapers in the cooling holes extending from the outlets toward the interior of the components.

Other features of the present invention will be in part apparent and in part pointed out hereinafter.

DETAILED DESCRIPTION OF THE INVENTION

In one aspect the invention involves modifying the shape of existing cooling holes to enhance their performance. In another aspect the invention involves repairing cooling holes by removing cracks in the cooling holes while modifying their shape to enhance their performance.

In accordance with this invention the coating which is typically on a gas turbine engine nozzle airfoil or turbine blade airfoil (hereinafter collectively referred to as airfoils) to provide oxidation and hot gas corrosion resistance is removed, for example, by an acid chemical etch. This coating is typically a coating of aluminide, Pt-aluminide or Ni-aluminide. After removal of the coating, the outlets of the cooling holes are enlarged by machining by, for example, electro-discharge machining (EDM), laser machining, or electro-stream machining (ES). Material in the cooling hole walls is therefore trimmed away. The airfoil is then coated with an aluminide by a chemical vapor deposition process to provide an oxidation and hot gas corrosion resistant coating. For higher temperature applications it is desirable to further coat the airfoil with an insulating ceramic thermal barrier coating using physical vapor deposition or an air plasma spray process.

Figure 1:
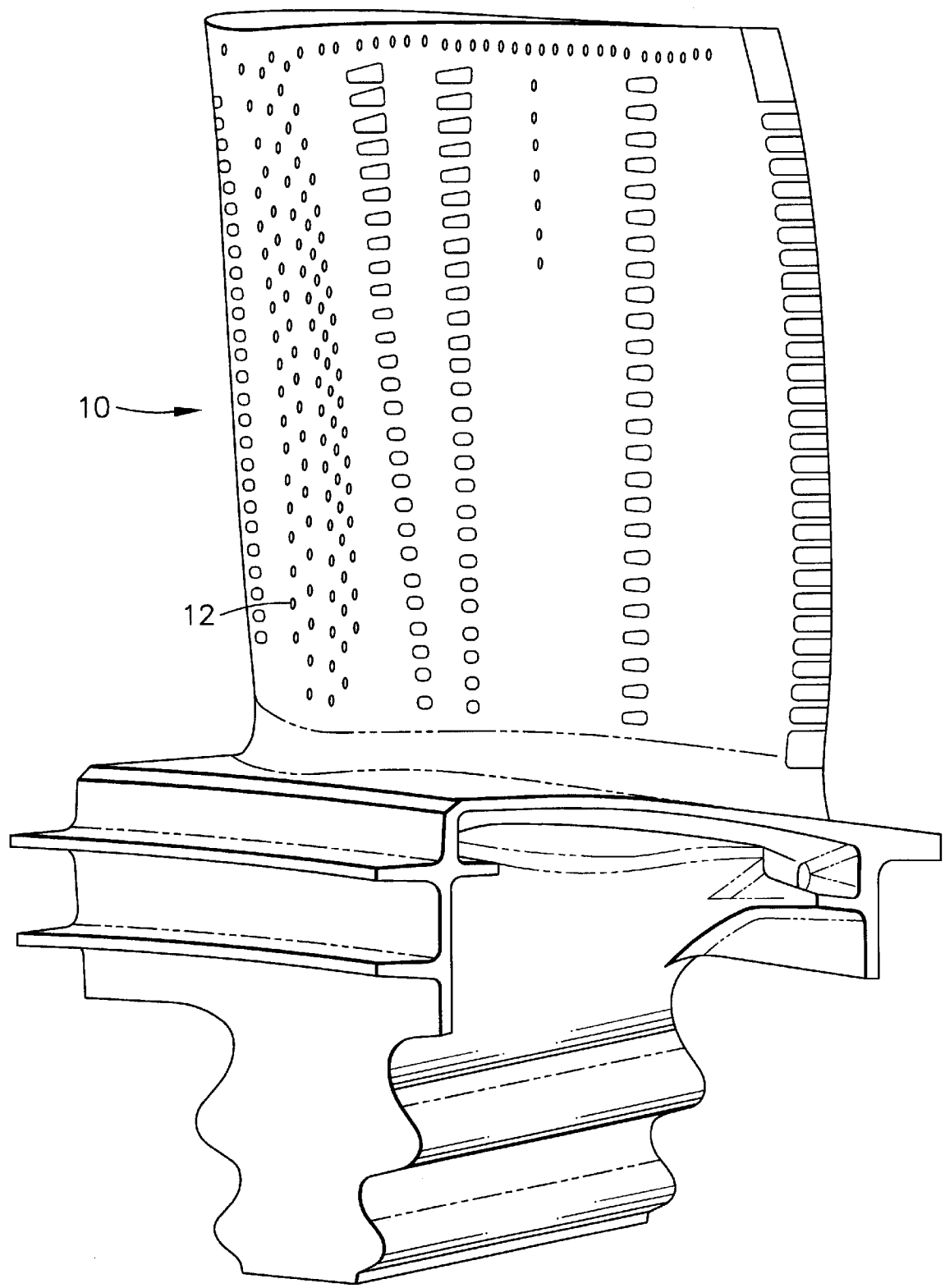
FIG. 1 is an exemplary airfoil of the type modified according to the method of the invention.

In machining cylindrical cooling holes such as those indicated in turbine airfoil 10 in FIG. 1 at reference numeral 12, the outlet of a given hole is enlarged to an outlet of greater size, and the shape of the interior of the hole adjacent the outlet is changed to exhibit a tapered cross-section, and further optionally changed from circular (i.e., cylindrical) to oval or rectangular. The effective outlet airflow path width for air exiting the repaired hole is on the order of up to about two and one half times the starting effective outlet airflow path width, preferably about two times the starting effective outlet airflow path width. In one preferred embodiment the effective airflow path width is increased to from about one and one half to two and one half times the original outlet airflow path width while the inlet metering hole diameter is the same as the original design.

Figure 2:
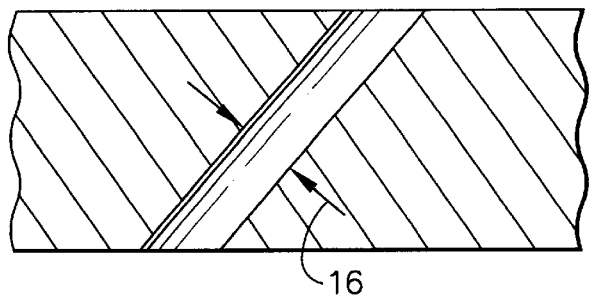
FIGS. 2–10 are schematic representations of cooling holes before and after modification according to method of the invention.
Figure 3:
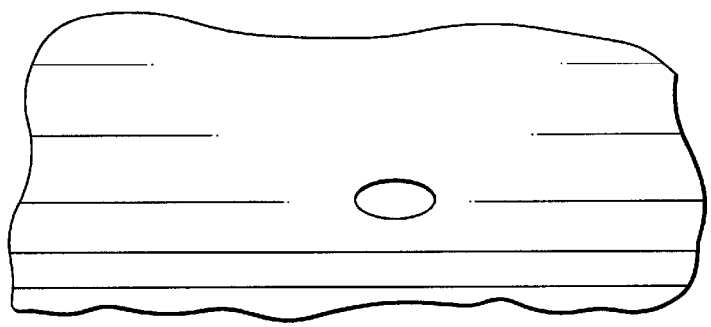
Figure 4:
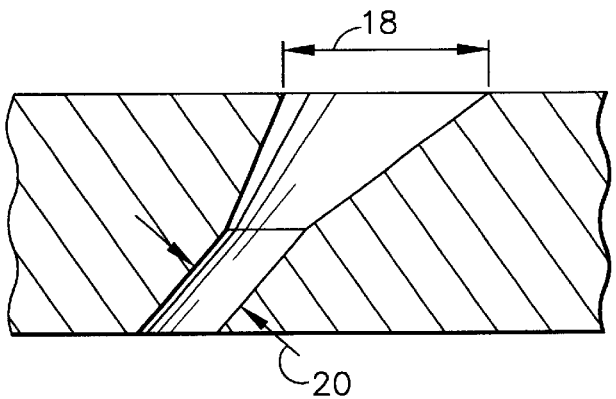
Figure 5:
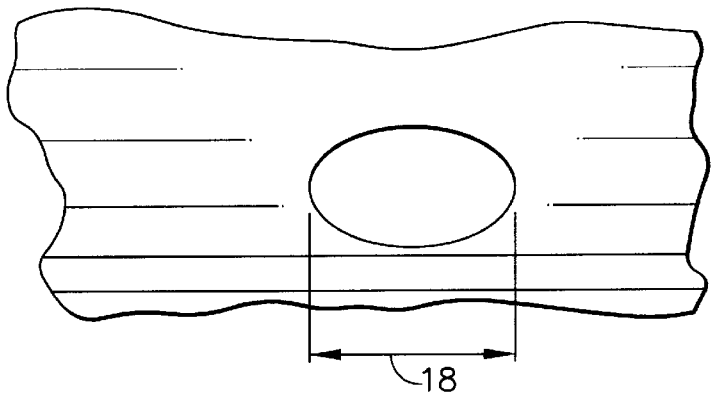

FIGS. 2 through 10 show the relative shapes and dimensions of holes prior to and after modification or repair according to this invention. FIG. 2 shows in cross-section a cylindrical hole prior to being repaired or modified. FIG. 3 is a top view of the same hole on the airfoil surface. The interior of the hole is cylindrical, and its cross-section transverse to the direction of airflow therethrough is circular, but because the hole intersects the surface at an angle, it appears oval. FIGS. 4 and 5 show the same hole in cross-section and as a top view on the airfoil surface, respectively, after the hole is enlarged to exhibit a taper as shown.

Figure 6:
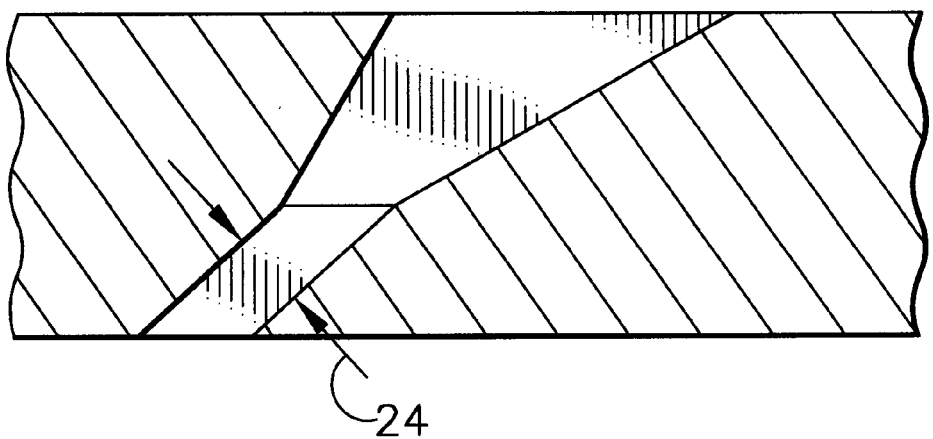
Figure 10:
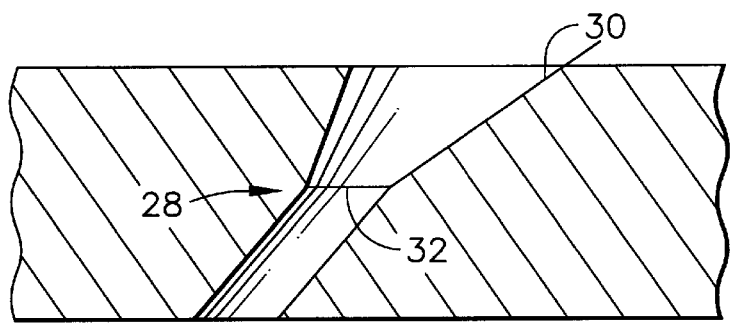

With specific regard to the taper as shown in FIG. 4, and comparable tapers in FIGS. 6 and 10, this taper is on the order of up to about 10 degrees from the axis of the cooling hole. FIG. 4 illustrates one particularly preferred embodiment where the taper in the cooling holes has a downstream angle of taper which is greater than the upstream angle of taper. The angle of taper is the angle between the cooling hole wall and the axis of the cooling hole. The upstream angle of taper is upstream with respect to the direction of hot gas flow over the airfoil and the downstream angle of taper is downstream with respect to the direction of hot gas flow over the airfoil. The airfoils in these figures are oriented such that hot gas flow across the airfoils is from left to right. The advantage to having this larger taper on the downstream side of the hole is that it reduces the exit angle of the cooling air onto the airfoil surface, which in turn results in less turbulence and smoother transition of the cooling air from out of the hole to a film dispersed on the airfoil surface. In each of the embodiments shown the taper and the angle of taper are also describable in terms of a flare and an angle of flare of up to on the order of 10 degrees, as the modified cooling hole has a flared section from its interior toward its outlet, and the angle of downstream angle of flare is optionally greater than the upstream angle of flare.

Figure 7:
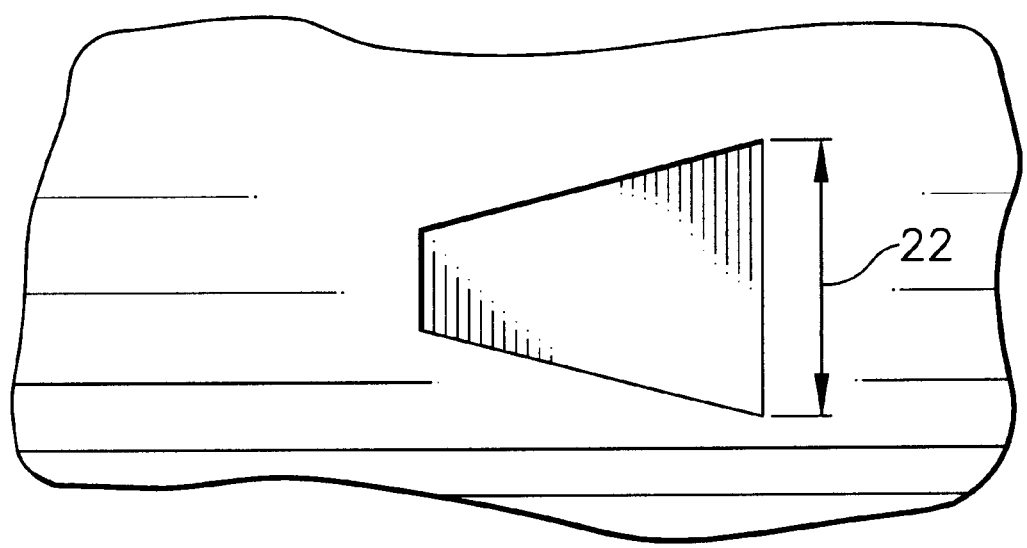

In one embodiment of the invention the circular cross-section of the hole transverse to the direction of airflow therethrough is optionally modified to be rectangular. FIGS. 6 and 7 show the same hole in crosssection and as a top view on the airfoil surface, respectively, after the hole is enlarged to exhibit a taper as shown and its shape modified to be rectangular. The interior of the hole is rectangular, but because the hole intersects the surface at an angle, it appears trapezoidal. In FIGS. 2–7 dimension 18 is on the order of roughly two to two and one half times dimension 20. Dimension 22 is on the order of roughly two to two and one half times dimension 24. Dimensions 20 and 24 are the same as dimension 16.

In another embodiment of the invention the circular cross-section of the hole transverse to the direction of airflow therethrough is optionally modified to be oval. At the airfoil surface the hole appears as an oval, similar to the oval appearance of the circular hole shown in FIG. 5, although the oval shape is more pronounced, i.e., elongate, in this optional embodiment where the hole interior is modified to be oval.

Circular cooling holes typically have a diameter of about 0.012 inch (0.03 cm) to about 0.025 inch (0.065 cm) in high pressure turbine blades for aircraft engine applications, and up to about 0.04 inch (0.1 cm) in high pressure turbine blades in power generation applications. By this method the effective outlet airflow path is roughly doubled to from roughly 0.024 inch (0.06 cm) to about 0.050 inch (0.13 cm) in aircraft engine applications, and to about 0.08 inch (0.2 cm) in power generation applications. The doubling of this dimension corresponds to a roughly tripling or quadrupling of the outlet size, depending on its shape. These relatively larger outlets advantageously serve as diffusers, which result in improved diffusion of cooling air, and thereby improve cooling by reducing separation between air film flow paths over the airfoil. The diffuser shaped holes spread the air out over the surface of interest. The larger exit area improves film coverage and overall film effectiveness.

The enlargement of the exit holes results in a lower air exit velocity and a corresponding lower film blowing ratio. The film blowing ratio is defined as the density times the velocity of the cooling gas over the density times the velocity of the hot gas over the airfoil. This ratio should be maintained below about one and one half to about two to prevent blow-off, i.e., lifting of the cooling film off the airfoil surface.

The hole is not to be bored out so large, however, as to result in flow separation and, in particular, recirculation of cooling gas back into the hole, as such flow separation and recirculation tends to draw hot gas from outside the airfoil down into the cooling hole. The amount of flow separation and recirculation depends on the relationship between the cooling gas flow rate out of the hole and the hot gas flow rate across the outlet. It has been discovered that by machining away material so as to increase the effective outlet flow path width by less than about two-and-one-half times the original flow width, the undesired flow separation and recirculation are avoided. In the embodiment of the invention involving crack removal, the amount of material removed from the hole during repair is selected to be large enough that cracks at or near the surface are completely removed.

In one particular embodiment of the invention where the repaired or modified holes have a quadrilateral outlet shape as viewed on the airfoil surface, the outlets preferably have two opposite parallel sides of differing length and two opposite non-parallel sides of the same length, i.e., a trapezoid as illustrated in FIG. 7. Machining is preferably carried out so that the holes are oriented with the parallel sides generally transverse to the direction of airflow over the airfoil, with the longer of the parallel sides downstream of the shorter of the parallel sides.

Figure 8:
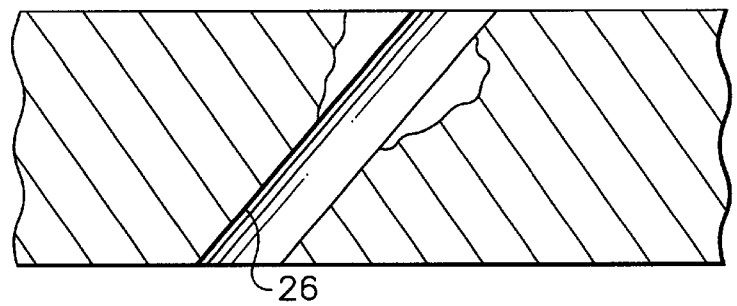
Figure 9:
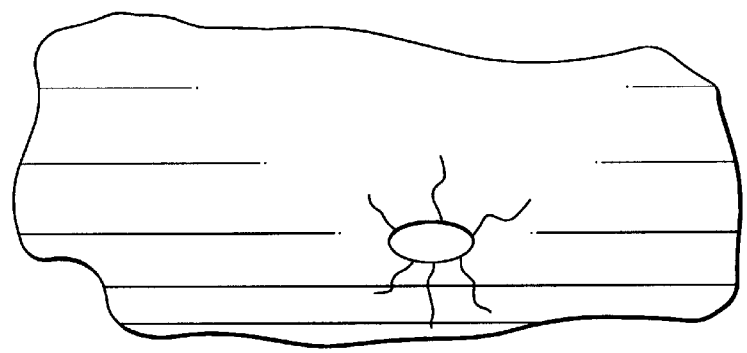

FIG. 8 illustrates a cooling hole at 26 in cross-section exhibiting cracks before machining and FIG. 9 illustrates the same hole as viewed from the top at the airfoil surface. FIG. 10 illustrates the same hole after machining in accordance with this invention at 28. The hole before machining has roughly parallel side walls with cracks propagating therefrom. The hole after machining generally defines a tapered section with the hole having a larger dimension 30 at the outlet as compared to its dimension at the point 32 where machining is terminated. The cracked material between 30 and 32 is removed. To facilitate smooth airflow it is preferred that the side walls taper gradually as shown rather than in stepwise fashion. In one particularly preferred embodiment the depth of machining from the outlet to the termination point 32 is about two thirds of the airfoil wall thickness.

The cooling air inlets into the cooling air passages are within the airfoil and their size is selected for desired metering of air into the passages. Inasmuch as these inlets are not machined in carrying out the invention and are maintained at the same dimensions as the original design requirement, the flow rate of cooling air is not significantly changed by this repair method.

As various changes could be made in the above constructions without departing from the scope of the invention, it is intended that all matter contained in the above description or shown in the accompanying drawings shall be interpreted as illustrative and not in a limiting sense. For example, while the method is illustrated in the context of airfoils, its application to other film-cooled components is within the scope of the invention.

What is claimed is:

1. A method for modifying cooling holes in a gas turbine engine film-cooled component, said component comprising a body and said cooling holes, wherein said cooling holes have cooling hole walls extending from the interior of the body and terminating at cooling hole outlets proximate the external surface of the body, said method for modifying said cooling holes comprising machining said cooling holes to remove material from said cooling hole walls, to enlarge said outlets, and to form tapers in said cooling holes extending from the outlets toward the interior of the body.

2. The method of claim 1 wherein said cooling hole walls exhibit cracks prior to machining and wherein the method comprises machining said cooling holes to remove said cracks.

3. The method of claim 1 wherein said cooling holes have circular cross-sections transverse to the direction of airflow therethrough along the entire length of the cooling holes prior to said machining and wherein the method comprises machining said cooling holes to modify the circular cross-sections to quadrilateral cross-sections along a segment of the length of the cooling holes extending from the outlets into the cooling holes.

4. The method of claim 3 wherein said cooling hole walls exhibit cracks prior to machining and wherein the method comprises machining said cooling holes to remove said cracks.

5. The method of claim 1 wherein said cooling holes have circular cross-sections transverse to the direction of airflow therethrough along the entire length of the cooling holes prior to said machining and wherein the method comprises machining said cooling holes to modify the circular cross-sections to oval cross-sections along a segment of the length of the cooling holes extending from the outlets into the cooling holes.

6. The method of claim 5 wherein said cooling hole walls exhibit cracks prior to machining and wherein the method comprises machining said cooling holes to remove said cracks.

7. The method of claim 1 wherein said tapers in said cooling holes have downstream angles of taper which are greater than corresponding upstream angles of taper.

8. A method for modifying cooling holes in a gas turbine engine film-cooled component, said component comprising a) a body, b) said cooling holes, wherein said cooling holes have cooling hole walls extending from the interior of the body and terminating at cooling hole outlets proximate the external surface of the body, and c) a coating on the body extending to said cooling hole walls, said method for modifying said cooling holes comprising:

removing said coating from the body;

machining said cooling holes to remove material from said cooling hole walls, to enlarge said outlets, and to form tapers in the cooling holes extending from the outlets toward the interior of the body; and depositing a coating onto said body extending to said cooling hole walls.

9. The method of claim 8 wherein said cooling hole walls exhibit cracks prior to machining and wherein the method comprises machining said cooling holes to remove said cracks.

10. The method of claim 8 wherein said cooling holes have circular cross-sections transverse to the direction of airflow therethrough along the entire length of the cooling holes prior to said machining and wherein the method comprises machining said cooling holes to modify the circular cross-sections to quadrilateral cross-sections along a segment of the length of the cooling holes extending from the outlets into the cooling holes.

11. The method of claim 10 wherein said cooling hole walls exhibit cracks prior to machining and wherein the method comprises machining said cooling holes to remove said cracks.

12. The method of claim 8 wherein said cooling holes have circular cross-sections transverse to the direction of airflow therethrough along the entire length of the cooling holes prior to said machining and wherein the method comprises machining said cooling holes to modify the circular cross-sections to oval cross-sections along a segment of the length of the cooling holes extending from the outlets into the cooling holes.

13. The method of claim 12 wherein said cooling hole walls exhibit cracks prior to machining and wherein the method comprises machining said cooling holes to remove said cracks.

14. A method for modifying cooling holes in a gas turbine engine Ni-based alloy film-cooled airfoil, the airfoil comprising a) an airfoil body, b) said cooling holes, wherein said cooling holes have cooling hole walls extending from the interior of the airfoil body and terminating at cooling hole outlets having original cooling airflow path widths of between about 0.012 inch (0.03 cm) and about 0.040 inch (0.1 cm) proximate the external surface of the airfoil body, c) an aluminide coating on the airfoil body extending to said cooling hole walls, and d) cracks in said cooling hole walls, said method for repairing said cooling holes comprising:

acid etching said aluminide coating to remove said aluminide coating from the airfoil body machining said cooling hole outlets by a machining technique selected from the group of techniques comprising from electro-discharge machining, laser machining, and electro-stream machining to remove a portion of said cooling hole walls comprising said cracks thereby forming tapered segments in said cooling holes extending from said cooling hole outlets into said airfoil body and to enlarge said cooling hole outlet airflow path widths by from about one and one half to about two and one half times said original cooling hole outlet airflow path widths; and depositing an aluminide coating onto said airfoil body extending to said cooling hole walls by a vapor phase aluminide technique.

15. A method for modifying cooling holes in a gas turbine engine film-cooled component, the component comprising a) a body, b) said cooling holes, wherein said cooling holes have cooling hole walls extending from the interior of the body and terminating at cooling hole outlets proximate the external surface of the body, and c) cracks in said cooling hole walls, said method for repairing said cooling holes comprising:

machining said cooling holes to remove a portion of said cooling hole walls comprising said cracks, to enlarge said outlets, and to form tapers in the cooling holes extending from the outlets toward the interior of the body.

16. The method of claim 15 wherein said cooling holes have circular cross-sections transverse to the direction of airflow therethrough along the entire length of the cooling holes prior to said machining and wherein the method comprises machining said cooling holes to modify the circular cross-sections to quadrilateral cross-sections along a segment of the length of the cooling holes extending from the outlets into the cooling holes.

17. The method of claim 16 wherein said cooling holes have circular cross-sections transverse to the direction of airflow therethrough along the entire length of the cooling holes prior to said machining and wherein the method comprises machining said cooling holes to modify the circular cross-sections to oval cross-sections along a segment of the length of the cooling holes extending from the outlets into the cooling holes.

18. The method of claim 15 wherein said tapers in said cooling holes have downstream angles of taper which are greater than corresponding upstream angles of taper.

* * * * *